(12) United States Patent
Nagata et al.

(10) Patent No.: US 7,185,917 B2
(45) Date of Patent: Mar. 6, 2007

(54) KNEE BOLSTER STRUCTURE

(75) Inventors: Nobuhiro Nagata, Tokyo (JP);
Tomiyuki Yasuno, Tokyo (JP);
Tsutomu Kawashima, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 233 days.

(21) Appl. No.: 10/941,528

(22) Filed: Sep. 14, 2004

(65) Prior Publication Data

US 2005/0062276 A1 Mar. 24, 2005

(30) Foreign Application Priority Data

Sep. 22, 2003 (JP) ............... 2003-330384

(51) Int. Cl.
*B60R 21/02* (2006.01)
*B60R 21/045* (2006.01)
(52) U.S. Cl. .................. 280/748; 280/752; 180/90
(58) Field of Classification Search ............ 280/730.1, 280/751, 753, 752, 728.1, 728.3, 743.1, 732, 280/743.2, 748; 296/187.05, 70; 180/90; 188/377; *B60R 21/045*
See application file for complete search history.

(56) References Cited

U.S. PATENT DOCUMENTS

| 4,951,963 A | * | 8/1990 | Behr et al. ............. 280/753 |
| 5,476,283 A | * | 12/1995 | Elton ..................... 280/753 |
| 5,496,066 A | * | 3/1996 | Hoffmann et al. ...... 280/753 |
| 6,039,380 A | * | 3/2000 | Heilig et al. ........... 295/70 |
| 6,416,079 B1 | * | 7/2002 | Lutz et al. ............. 280/730.1 |
| 7,048,298 B2 | * | 5/2006 | Arwood et al. ........ 280/730.1 |

FOREIGN PATENT DOCUMENTS

JP 10-217881 8/1998

* cited by examiner

*Primary Examiner*—Paul N. Dickson
*Assistant Examiner*—Tiffany L. Webb
(74) *Attorney, Agent, or Firm*—J.C. Patents

(57) ABSTRACT

A knee bolster structure includes an upper shock-absorbing member adapted for absorbing input force of knees of an occupant who has an average physical constitution and a lower shock-absorbing member adapted for absorbing input force of knees of an occupant who is small in stature, and a difference in strength between the upper shock-absorbing member and the lower shock-absorbing member is provided such that receiving strength of the upper shock-absorbing member is larger and receiving strength of the lower shock-absorbing member is smaller.

20 Claims, 3 Drawing Sheets

KNEE BOLSTER STRUCTURE

BACKGROUND OF THE INVENTION

1. Field of the Invention

The present invention relates to a knee bolster structure.

2. Description of the Related Art

There has been consideration in the field of vehicles such as automobiles to install a knee bolster in the interior of vehicle, to protect knees of an occupant seated in a front seat of the vehicle when a load, for example, impulsive force at a collision of the vehicle, is applied.

As disclosed in JP-A H10-217881, such a knee bolster is generally designed to absorb input force applied from knees of an occupant who has an average physical constitution, and particularly, to absorb input force of knees of a male occupant who has an average physical constitution.

Although the knee bolsters as mentioned above are intended for the occupants who have the average physical constitution, however, there are occupants who are small in stature, so that it has been desired to provide knee bolsters to cope with the small stature occupants as well.

SUMMARY OF THE INVENTION

The present invention has been made in view of the above-mentioned problem. Therefore, it is an object of the present invention to provide a knee bolster structure adapted for or capable of coping with both an occupant who has an average physical constitution and an occupant who is small in stature.

To accomplish the above mentioned object, the knee bolster structure of the present invention comprises a vehicle body-side member; a shock-absorbing member fixed to the vehicle body-side member; and a knee-receiving member attached to the shock-absorbing member and adapted for receiving input force applied from knees of an occupant; the knee-receiving member being attached to the vehicle body-side member through the shock-absorbing member, wherein the shock-absorbing member comprises vertically separated two members: an upper shock-absorbing member adapted for absorbing input force of knees of an occupant who has an average physical constitution and a lower shock-absorbing member adapted for absorbing input force of knees of an occupant who is small in stature; and a difference in strength between the upper shock-absorbing member and the lower shock-absorbing member is provided such that receiving strength of the upper shock-absorbing member is larger and receiving strength of the lower shock-absorbing member is smaller.

Following are preferred embodiments (1) to (7) of the knee bolster structure according to the present invention. Any combinations thereof are considered to be preferred ones of the present invention unless any contradictions occur.

(1) The knee-receiving member comprises upper and lower parts corresponding to the upper and lower shock-absorbing members, respectively, and a deformation allowing portion formed between the upper part and the lower part of the knee-receiving member and adapted for allowing the upper and lower parts to be separately and individually deformed respectively.

(2) The knee bolster structure according to the embodiment (1) further comprises an ejecting mechanism interposed between the upper and the lower shock-absorbing members and the knee-receiving member, for displacing the lower part of the knee-receiving member toward a rear side of a vehicle and thereby enabling the knee-receiving member to receive the input force of the knees of the occupant who is small in stature at an earlier point of time.

(3) The ejecting mechanism turns the knee-receiving member relative to the upper shock-absorbing member to displace the lower part of the knee-receiving member toward the rear side of the vehicle.

(4) The ejecting mechanism comprises an airbag.

(5) The knee bolster structure according to the embodiment (4) further comprises first and second hinge leg members of which upper ends are connected by a hinge, the knee-receiving member is attached to the second hinge leg member, a tip of the upper shock-absorbing member is attached to a hinged portion of the first hinge leg member, the lower shock-absorbing member is attached to an opening end side of the first hinge leg member, and the air bag is interposed between the first and second hinge leg members to open them around the hinged portion.

(6) A pair of the shock-absorbing member is provided at left and right sides of the knee-receiving member corresponding to both knees of the occupant, respectively.

(7) The difference in strength is provided by at least one selected from the group consisting of (1) providing a difference in length between the upper and the lower shock-absorbing members by shortening a total length of the upper shock-absorbing member and elongating that of the lower shock-absorbing member, (2) making the upper shock-absorbing member thicker and the lower shock-absorbing member thinner, and (3) making a cross-sectional shape of the upper shock-absorbing member larger than that of the lower shock-absorbing member.

According to the present invention, since the shock-absorbing member is divided into the upper shock-absorbing member and the lower shock-absorbing member, and the strength difference is provided between them such that the receiving strength of the upper shock-absorbing member is larger and the receiving strength of the lower shock-absorbing member is smaller, the upper shock-absorbing member is adapted to appropriately absorb the input force of the knees of the occupant who has the average physical constitution, and the lower shock-absorbing member is adapted to appropriately absorb the input force of the knees of the occupant who is small in stature, thereby making it possible to change the receiving strength in accordance with difference in physical constitution of the occupant who has the average physical constitution and the occupant who is small in stature, and to have functions which cope with both types of occupants.

In addition, according to one embodiment of the present invention, since the upper and lower parts of the knee-receiving member are allowed to deform separately and individually by the deformation allowing portion formed between the upper part of the knee-receiving member which corresponds to the upper shock-absorbing member and the lower part of the knee-receiving member which corresponds to the lower shock-absorbing member, it is possible to bring out performance of absorbing the input force of the knees of the respective upper and lower shock-absorbing members and more effectively.

BRIEF DESCRIPTION OF THE DRAWINGS

For a better understanding of the invention, reference is made to the attached drawings, wherein.

DESCRIPTION OF THE PREFERRED EMBODIMENT

According to the present invention, the above mentioned object, which is to cope with both an occupant who has an average physical constitution and an occupant who is small in stature, is realized by means of dividing a shock-absorbing member into an upper shock-absorbing member and a lower shock-absorbing member, and providing a difference in strength between them such that receiving strength of the upper shock-absorbing member is larger and receiving strength of the lower shock-absorbing member is smaller.

Here, the wording "receiving strength" stands for a degree of durability against external force, such as the input force applied from the knees of the occupants or the like, that the upper and lower shock-absorbing member receives, for example. Therefore, it may be defined as "knee input force-resisting power" or resistance.

Hereinafter, an embodiment of the present invention will be described with reference to accompanying drawings.

Figure 1:
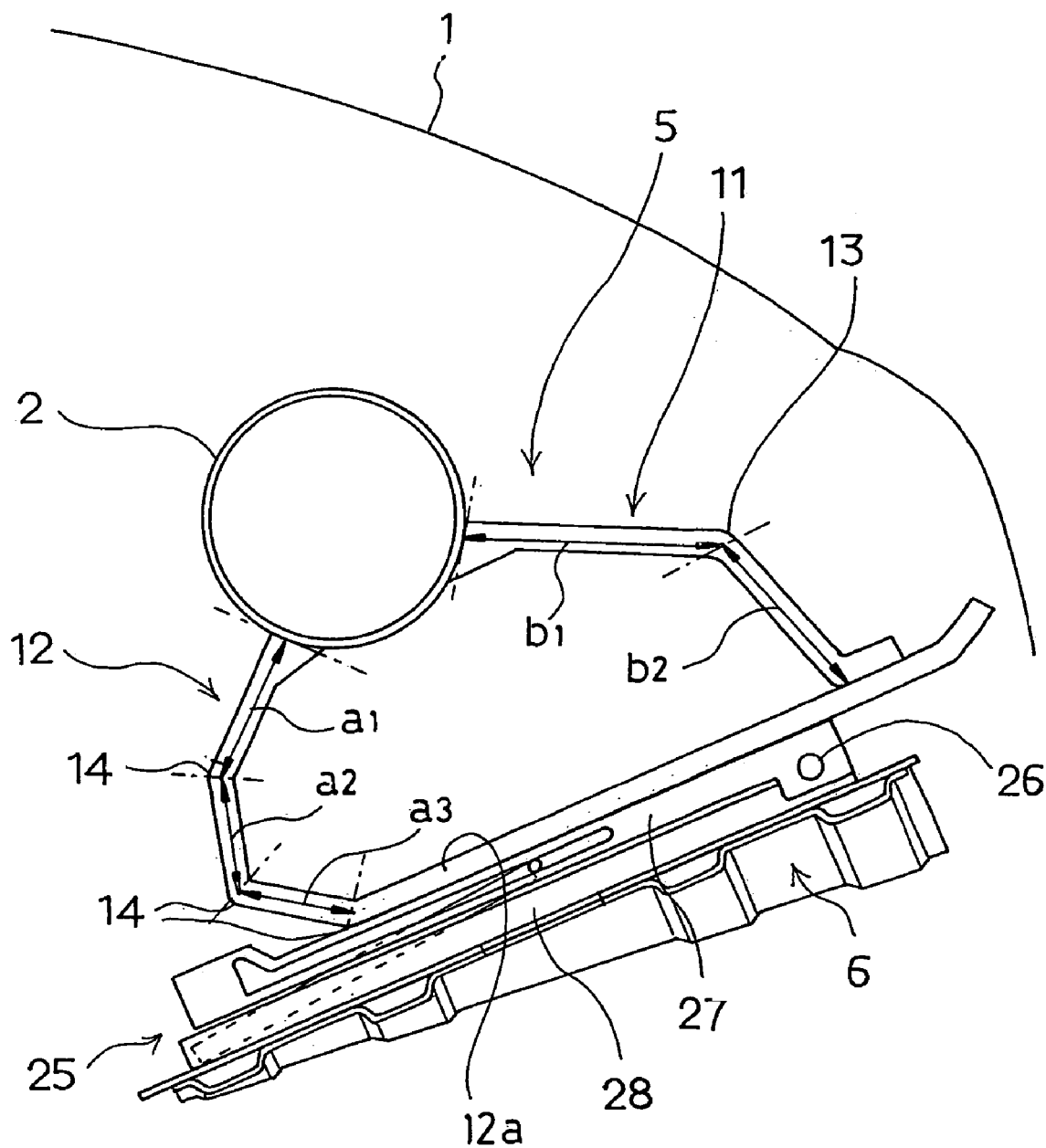
FIG. 1 is a side view of an embodiment according to the present invention.
Figure 2:
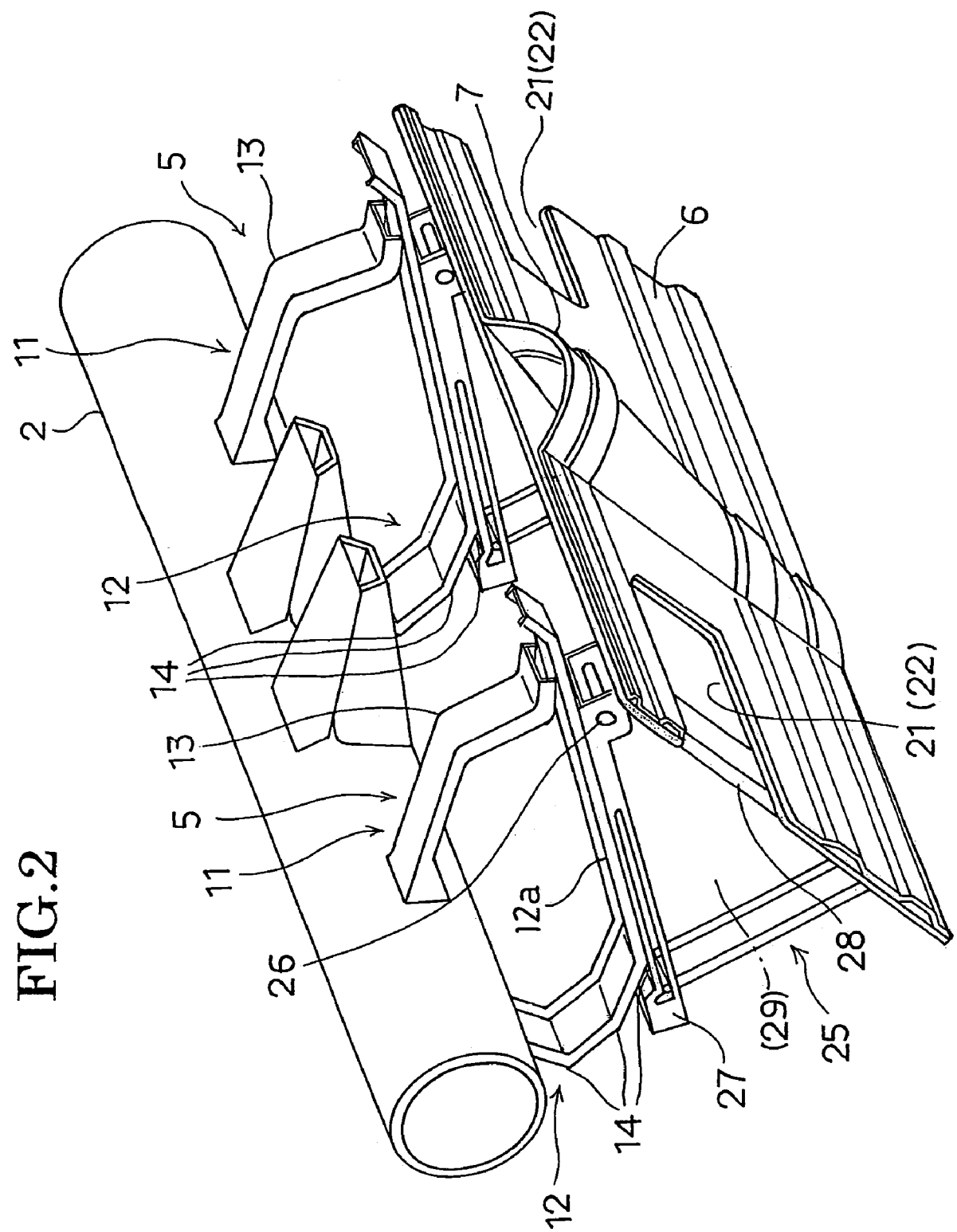
FIG. 2 is a perspective view of FIG. 1.
Figure 3:
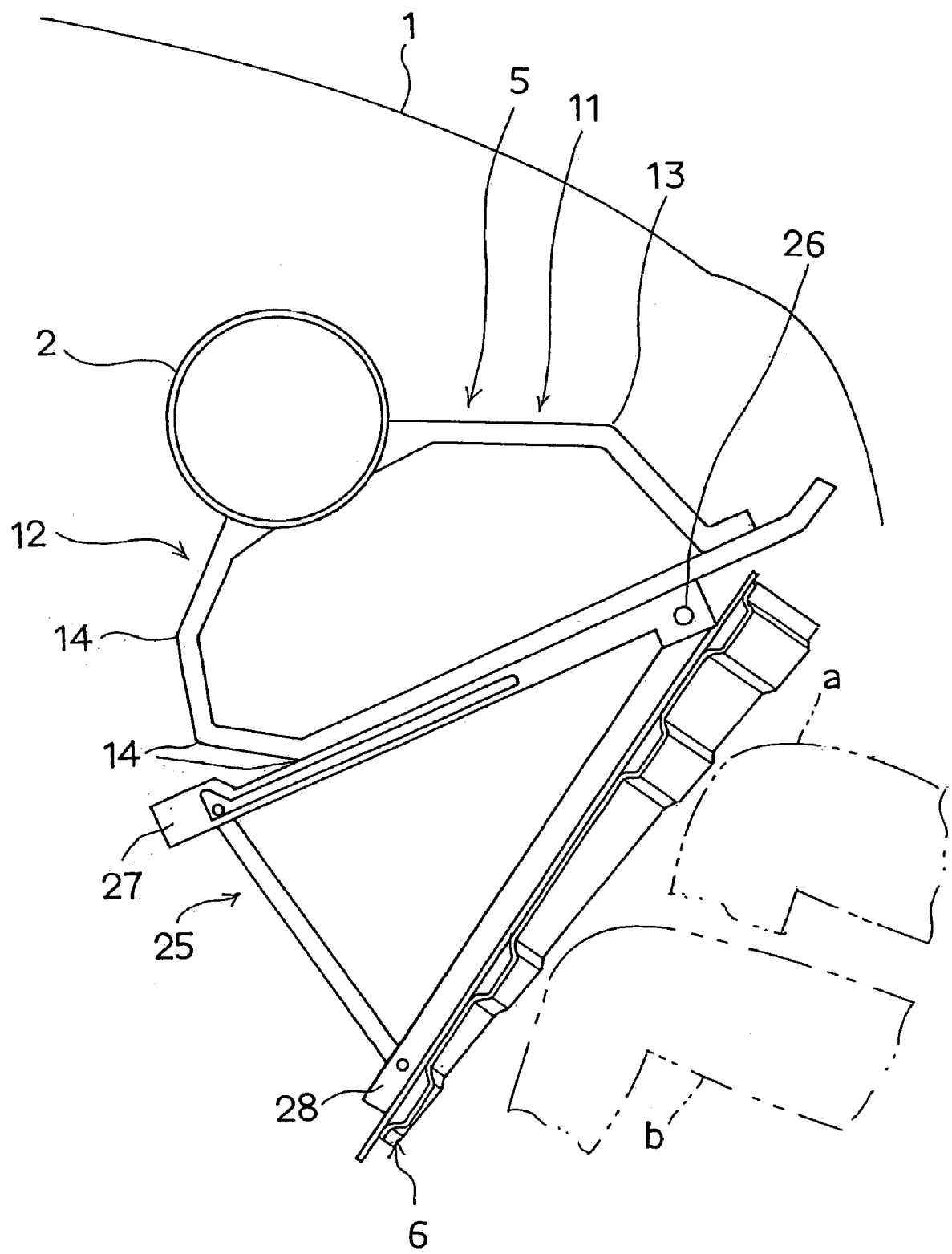
FIG. 3 is a view to show operation of the embodiment shown in FIG. 1.

FIGS. 1 to 3 show the embodiment of the present invention.

First, description on the construction of the knee bolster structure according to the present invention will be given. A vehicle such as an automobile is provided with an instrument panel 1 at the front of an inner side of a vehicle interior. Inside of the instrument panel 1 is provided with a vehicle body-side member 2 such as a steering support member. The vehicle body-side member 2 such as the steering support member is a reinforcing member which extends substantially horizontally in a vehicle-width direction, and connects left and right side frames of the vehicle body. The steering support member is attached with a steering column at a driver seat side.

The vehicle body-side member 2 is attached, via a shock-absorbing member 5, with a knee-receiving member 6 for receiving input force applied from knees of the occupant. The knee-receiving member 6 is provided for at least either one or each of the driver seat side and a front passenger seat side. In addition, the knee-receiving member 6 is in a plate-like shape, substantially, so as to be able to receive the input force of the knees with a wide area. In this embodiment, a pair of the shock-absorbing member 5 is provided at left and right sides corresponding to both knees of the occupant, respectively. Accordingly, the knee-receiving member 6 is attached to link the left and right shock-absorbing members 5. When providing the knee-receiving member 6 at the driver seat side, a column detouring portion 7 which extends in a substantially vertical direction and in a bent convex shape that protrudes in a vehicle rear-side direction may be formed at a central portion of the knee-receiving member if necessary, to avoid an interference of the knee-receiving member with a steering column or the like. Also, a decorative member may be attached to a surface of the knee-receiving member 6, such as a corrugated surface plate as shown in FIG. 2 which also works as reinforcement of the knee-receiving member 6. The knee-receiving member 6 may be made from material that does not damage the knees of the occupant when the knees abut thereto, such as fiber-reinforced plastic.

In this embodiment, each of the shock-absorbing members 5 is divided into vertically arranged two members: an upper shock-absorbing member 11 adapted for or capable of absorbing the input force of the knees of the occupant who has the average physical constitution (knee "a" shown in FIG. 3) and a lower shock-absorbing member 12 adapted for or capable of absorbing the input force of the knees of the occupant who is small in stature (knee "b" shown in FIG. 3). The upper shock-absorbing member 11 is structured to be able to mainly receive the input force of the knees against an upper part of the knee-receiving member 6, while the lower shock-absorbing member 12 is structured to be able to mainly receive the input force of the knees against a lower part of the knee-receiving member 6.

Moreover, a difference in strength between the upper shock-absorbing member 11 and the lower shock-absorbing member 12 is provided, such that receiving strength of the upper shock-absorbing member 11 is larger and receiving strength of the lower shock-absorbing member 12 is smaller. In order to provide the strength difference, a difference in length between the upper and the lower shock-absorbing members is provided, by shortening a total length of the upper shock-absorbing member 11 and elongating that of the lower shock-absorbing member 12. Here, the wording "total length" means "$a_1+a_2+a_3$" for the lower shock-absorbing member and "$b_1+b_2$" for the upper shock-absorbing member.

Alternatively, the upper shock-absorbing member 11 may be made thicker, while the lower shock-absorbing member 12 may be made thinner. More alternatively, a cross-sectional shape of the upper shock-absorbing member 11 may be made larger than that of the lower shock-absorbing member 12. Furthermore, any other means than mentioned above, or a combination of them may be employed. For example, the upper and lower shock-absorbing members may be made from metal. Alternatively, the upper and lower shock-absorbing members may be made from metals having different characteristics to each other.

Further, the upper and lower shock-absorbing members may be fixed to the vehicle body-side member by an appropriate means such as welding.

A base end of the upper shock-absorbing member 11 is connected to that part of the vehicle body-side member 2 which faces toward the rear side of the vehicle. In addition, the upper shock-absorbing member 11 has at least one bent portion 13 at an intermediate portion thereof for enabling absorption of the input force of the knees of the occupant who has the average physical constitution, so that the upper shock-absorbing member is formed in a bent convex shape, substantially, if viewed from a side of the knee bolster structure. A base end of the lower shock-absorbing member 12 is connected to that part of the vehicle body-side member 2 which faces toward the front side of the vehicle. Additionally, the lower shock-absorbing member 12 has plural bent portions 14 at an intermediate portion thereof for enabling absorption of the input force of the knees of the occupant who is small in stature, so that the lower shock-absorbing member is formed in a bent concave shape, substantially, if viewed from a side of the knee bolster structure.

In this embodiment, the lower shock-absorbing member has a continuously extended portion 12a turned in a direction from the front side to the rear side of the vehicle, as shown in FIGS. 1 and 2.

A tip of the upper shock-absorbing member 11 is connected to a desired back surface of a tip of the extended portion of the lower shock-absorbing member 12.

A deformation allowing portion 21 is formed between the upper part of the knee-receiving member 6 corresponding to the upper shock-absorbing member 11 and the lower part of the knee-receiving member 6 corresponding to the lower shock-absorbing member 12, and is adapted for or capable of allowing the upper and lower parts of the knee-receiving member 6 to be separately and individually deformed respectively. The deformation allowing portion 21 may be an incision portion 22 which is formed, at an intermediate portion of the knee-receiving member 6, in a substantially horizontal slit shape, for example. The incision portion 22 is formed at each of both sides of the knee-receiving member 6 in such a manner as to keep away from the column detouring portion 7, however, the incision portion 22 may be formed in such a manner that a part of the incision portion is overlapped with the column detouring portion 7. Furthermore, the deformation allowing portion 21 may be formed by a substantially horizontal elongate opening or perforations, etc.

Meanwhile, in this embodiment, an ejecting mechanism 25 is interposed, between the upper and the lower shock-absorbing members 11, 12 and the knee-receiving member 6, for enabling the knee-receiving member 6 to receive the input force of the knees of the occupant who is small in stature at an earlier point of time, by displacing the lower part of the knee-receiving member 6 toward the rear side of the vehicle. The ejecting mechanism 25 has a structure in which an airbag 29 is interposed between first and second hinge leg members 27 and 28, while their upper ends are connected to each other by a hinge 26.

The ejecting mechanism 25 turns the knee-receiving member 6 relative to the upper shock-absorbing member 11 to displace the lower part of the knee-receiving member 6 toward the rear side of the vehicle.

More specifically, the knee-receiving member 6 is attached to the second hinge leg member 28, and a tip of the upper shock-absorbing member 11 is attached to a hinged portion of the first hinge leg member 27. In addition, the lower shock-absorbing member 12 is attached to an opening end side of the first hinge leg member 27, and the air bag 29 is interposed between the first and second hinge leg members 27 and 28 to open them around the hinged portion.

Next, operation of the present embodiment will be described below.

When a load such as impulsive force at a collision of the vehicle is applied to the vehicle, the airbag 29 of the ejecting mechanism 25 is inflated automatically, displacing the lower part of the knee-receiving member 6 toward the rear side of the vehicle around the hinge 26 as the center. This makes it possible to receive the input force of the knees of the occupant who is small in stature at the earlier point of time.

Here, the knee "a" of the occupant who has the average physical constitution abuts the upper part of the knee-receiving member 6, while the knee "b" of the occupant who is small in stature abuts the lower part of the knee-receiving member 6.

The input force of the knees of the occupant who has the average physical constitution is absorbed by the deformation of the upper shock-absorbing member 11. Also, the input force of the knees of the occupant who is small in stature is absorbed by the deformation of the lower shock-absorbing member 12.

Although the embodiment of the present invention has been described in detail with reference to the drawings, the embodiment is a mere example of the present invention. It is therefore to be understood that the present invention is not limited to the structure of the embodiment, and changes and variations made without departing from the scope and spirit of the present invention are included therein.

What is claimed is:

1. A knee bolster structure, comprising:
a vehicle body-side member;
a shock-absorbing member fixed to said vehicle body-side member; and
a knee-receiving member attached to said shock-absorbing member and adapted for receiving input force applied from knees of an occupant;
said knee-receiving member being attached to said vehicle body-side member through said shock-absorbing member, wherein
said shock-absorbing member comprises vertically separated two members: an upper shock-absorbing member adapted for absorbing input force of knees of an occupant who has an average physical constitution and a lower shock-absorbing member adapted for absorbing input force of knees of an occupant who is small in stature; and
a difference in strength between said upper shock-absorbing member and said lower shock-absorbing member is provided such that receiving strength of said upper shock-absorbing member is larger and receiving strength of said lower shock-absorbing member is smaller.

2. The knee bolster structure according to claim 1, wherein said knee-receiving member comprises upper and lower parts corresponding to said upper and lower shock-absorbing members, respectively, and a deformation allowing portion formed between the upper part and the lower part of said knee-receiving member and adapted for allowing said upper and lower parts to be separately and individually deformed respectively.

3. The knee bolster structure according to claim 2, further comprising an ejecting mechanism interposed between said upper and said lower shock-absorbing members and said knee-receiving member, for displacing said lower part of said knee-receiving member toward a rear side of a vehicle and thereby enabling said knee-receiving member to receive the input force of the knees of the occupant who is small in stature at an earlier point of time.

4. The knee bolster structure according to claim 3, wherein said ejecting mechanism turns said knee-receiving member relative to said upper shock-absorbing member to displace the lower part of said knee-receiving member toward the rear side of the vehicle.

5. The knee bolster structure according to claim 4, wherein said ejecting mechanism comprises an airbag.

6. The knee bolster structure according to claim 5, further comprising first and second hinge leg members of which upper ends are connected by a hinge, said knee-receiving member is attached to the second hinge leg member, a tip of said upper shock-absorbing member is attached to a hinged portion of the first hinge leg member, said lower shock-absorbing member is attached to an opening end side of the first hinge leg member, and said air bag is interposed between the first and second hinge leg members to open them around the hinged portion.

7. The knee bolster structure according to claim 6, wherein a pair of said shock-absorbing members are provided at left and right sides of said knee-receiving member corresponding to both knees of the occupant, respectively.

8. The knee bolster structure according to claim 3, wherein said ejecting mechanism comprises an airbag.

9. The knee bolster structure according to claim 8, further comprising first and second hinge leg members of which upper ends are connected by a hinge, said knee-receiving member is attached to the second hinge leg member, a tip of said upper shock-absorbing member is attached to a hinged portion of the first hinge leg member, said lower shock-absorbing member is attached to an opening end side of the first hinge leg member, and said air bag is interposed between the first and second hinge leg members to open them around the hinged portion.

10. The knee bolster structure according to claim 9, wherein a pair of said shock-absorbing members are provided at left and right sides of said knee-receiving member corresponding to both knees of the occupant, respectively.

11. The knee bolster structure according to claim 1, further comprising an ejecting mechanism interposed between said upper and said lower shock-absorbing members and said knee-receiving member, for displacing a lower part of said knee-receiving member toward a rear side of a vehicle and thereby enabling said knee-receiving member to receive the input force of the knees of the occupant who is small in stature at an earlier point of time.

12. The knee bolster structure according to claim 11, wherein said ejecting mechanism turns said knee-receiving member relative to said upper shock-absorbing member to displace the lower part of said knee-receiving member toward the rear side of the vehicle.

13. The knee bolster structure according to claim 12, wherein said ejecting mechanism comprises an airbag.

14. The knee bolster structure according to claim 13, further comprising first and second hinge leg members of which upper ends are connected by a hinge, said knee-receiving member is attached to the second hinge leg member, a tip of said upper shock-absorbing member is attached to a hinged portion of the first hinge leg member, said lower shock-absorbing member is attached to an opening end side of the first hinge leg member, and said air bag is interposed between the first and second hinge leg members to open them around the hinged portion.

15. The knee bolster structure according to claim 14, wherein a pair of said shock-absorbing members are provided at left and right sides of said knee-receiving member corresponding to both knees of the occupant, respectively.

16. The knee bolster structure according to claim 11, wherein said ejecting mechanism comprises an airbag.

17. The knee bolster structure according to claim 16, further comprising first and second hinge leg members of which upper ends are connected by a hinge, said knee-receiving member is attached to the second hinge leg member, a tip of said upper shock-absorbing member is attached to a hinged portion of the first hinge leg member, said lower shock-absorbing member is attached to an opening end side of the first hinge leg member, and said air bag is interposed between the first and second hinge leg members to open them around the hinged portion.

18. The knee bolster structure according to claim 17, wherein a pair of said shock-absorbing members are provided at left and right sides of said knee-receiving member corresponding to both knees of the occupant, respectively.

19. The knee bolster structure according to claim 1, wherein said difference in strength is provided by at least one selected from the group consisting of (1) providing a difference in length between said upper and said lower shock-absorbing members by shortening a total length of said upper shock-absorbing member and elongating that of said lower shock-absorbing member, (2) making the upper shock-absorbing member thicker and the lower shock-absorbing member thinner, and (3) making a cross-sectional shape of said upper shock-absorbing member larger than that of said lower shock-absorbing member.

20. The knee bolster structure according to claim 1, wherein the upper shock-absorbing member includes a metal upper shock-absorbing member formed with at least one bent portion, wherein the lower shock-absorbing member includes a metal lower shock-absorbing member formed with a plurality of bent portions, and wherein the number of the bent portions formed on the lower shock-absorbing member is larger than the number of the bent portions formed on the upper shock-absorbing member.

* * * * *